(12) United States Patent
Peleman et al.

(10) Patent No.: US 11,780,205 B2
(45) Date of Patent: Oct. 10, 2023

(54) ELEMENT FOR PRODUCING A JACKET, FOLDER OR BOX

(71) Applicant: PELEMAN INDUSTRIES NV, Puurs (BE)

(72) Inventors: Guido Frans Maria Jozef Peleman, Knokke (BE); Pawan Moradia, Cumming, GA (US)

(73) Assignee: PELEMAN INDUSTRIES NV

( * ) Notice: Subject to any disclaimer, the term of this patent is extended or adjusted under 35 U.S.C. 154(b) by 0 days.

(21) Appl. No.: 17/703,433

(22) Filed: Mar. 24, 2022

(65) Prior Publication Data

US 2022/0305755 A1  Sep. 29, 2022

(30) Foreign Application Priority Data

Mar. 25, 2021  (BE) .................................. 2021/5224

(51) Int. Cl.
| | | |
|---|---|---|
| *B32B 7/12* | (2006.01) | |
| *B32B 3/30* | (2006.01) | |
| *B32B 29/00* | (2006.01) | |
| *B32B 29/08* | (2006.01) | |

(52) U.S. Cl.
CPC .................. *B32B 3/30* (2013.01); *B32B 7/12* (2013.01); *B32B 29/002* (2013.01); *B32B 29/08* (2013.01); *B32B 2553/00* (2013.01)

(58) Field of Classification Search
None
See application file for complete search history.

(56) References Cited

U.S. PATENT DOCUMENTS

| | | | | |
|---|---|---|---|---|
| 4,371,194 | A * | 2/1983 | Wang ..................... | B42D 3/002 412/37 |
| 4,371,195 | A | 2/1983 | Wang et al. | |
| 10,099,502 | B2 * | 10/2018 | Peleman ................. | B42C 11/02 |
| 2013/0292045 | A1 * | 11/2013 | Peleman ................. | B42C 7/006 156/227 |
| 2014/0069253 | A1 | 3/2014 | Gerke et al. | |

FOREIGN PATENT DOCUMENTS

| | | |
|---|---|---|
| EP | 2708352 A1 | 3/2014 |
| WO | 2010084399 A2 | 7/2010 |
| WO | 2015044726 A1 | 4/2015 |

OTHER PUBLICATIONS

Belgium Search Report dated Dec. 13, 2021 related to Belgium Application No. BE 2021/5224.

* cited by examiner

*Primary Examiner* — Alexander S Thomas
(74) *Attorney, Agent, or Firm* — Dinsmore & Shohl LLP

(57) ABSTRACT

An element for producing a jacket, folder or box, in which the element relates to a semi-finished product comprising a sheet which on at least one side is provided with a layer of hotmelt adhesive directly applied on the sheet for applying a finishing layer directly on the layer of hotmelt adhesive.

10 Claims, 2 Drawing Sheets

ELEMENT FOR PRODUCING A JACKET, FOLDER OR BOX

CROSS-REFERENCE TO RELATED APPLICATIONS

The present application claims priority to Belgium Patent Application No. 2021/5224 filed Mar. 25, 2021, the entire contents of which are hereby incorporated by reference into this application.

TECHNICAL FIELD

The present disclosure relates to an element for producing a jacket, folder or box.

In particular, the present disclosure is intended to provide an element in the form of a semi-finished or half finished product which is finished further by the end user into the eventual product.

BACKGROUND

Such elements are already known in the form of a sheet of, for example, rigid paper or cardboard, which may or may not be provided with grooves that allow the element to be folded into a jacket for, for example, a book, a folder for binding a bundle of leaves, for example, or a box to package an object in.

Traditionally, such element or sheet is provided with or coated with pre-glued paper.

The end user can then apply a finishing layer or final coating material on the element to give it the desired finish or personalisation.

It is not excluded hereby that the finishing layer on the outside is different to the finishing layer on the inside of the folder, jacket or box.

Subsequently, the finished and personalised element is then folded into a jacket, folder or box.

A disadvantage of such known elements is that the aforementioned grooves become very rigid due to the pre-glued paper and the finishing layer running over the grooves.

Not only is folding the element less smooth and easy, but in the folds themselves the different layers create a messy and sloppy appearance due to creasing and crumpling.

The purpose of the present disclosure is to provide a solution to at least one of the aforementioned and other disadvantages.

SUMMARY

The object of the present disclosure is an element for producing a jacket, folder or box, that the element relates to a semi-finished product comprising an uncoated sheet which on at least one side is provided with a layer of hotmelt adhesive which is directly applied on the sheet for applying a finishing layer directly on the hotmelt adhesive.

An uncoated sheet is a sheet here without finishing layer or added components.

In other words, such sheet contains one material or one piece or one assembly or one unit or is undivided.

'Directly applied on the sheet' is understood to mean that the hotmelt adhesive makes physical contact with the sheet, i.e. without an intermediate layer of paper or the like.

Similarly 'directly on the hotmelt adhesive' is understood to mean that the finishing layer makes physical contact with the hotmelt adhesive, i.e. without an intermediate layer of paper or the like.

The aforementioned finishing layer can be made of all kinds of materials, such as mat paper, shiny paper, fabric, linen, canvas, etc.

Furthermore, the finishing layer can be printed with text, photographs, drawings, film printing and the like.

This provides the advantage that by providing the hotmelt adhesive directly on the sheet on which the finishing layer can be applied, there is no longer a need to coat the sheet with pre-glued paper such that less material is used.

An additional advantage is that, as only one layer is applied around the sheet, the grooves will not become rigid such that folding the element can be done easily and smoothly.

Creasing and crumpling of the finishing layer will also be a lot less, as only the finishing layer is applied around the element.

In a practical embodiment, the sheet is produced from a rigid paper or cardboard.

Rigid here is understood to mean that the sheet will not bend or fold.

For the present disclosure it is important that a hotmelt adhesive is used, and for example not self-adhesive glue, which is then provided with a removable cover paper or the like.

It can indeed not be excluded that self-adhesive glue is applied on the edges of the grooves. The self-adhesive glue will not be covered by the finishing layer upon applying a finishing layer. When the sheet is then folded, the exposed glue will make contact with the material of the sheet, for example the cardboard. Consequently the groove will either be glued or the cardboard will be damaged upon reopening the groove.

According to an embodiment of the present disclosure, the sheet is provided with one or more grooves to form a hinge.

By the hinge, the sheet can be folded into the eventual jacket, folder or box after applying the finishing layer.

As only the finishing layer will be applied on the sheet and no other layers of paper or other types of layers, the thus formed hinges will not be rigid or difficult to fold after finishing or personalising the element.

In some embodiments, the grooves are grooved or milled in the sheet.

BRIEF DESCRIPTION OF THE DRAWINGS

With the intention of better showing the characteristics of the present disclosure, a few embodiments of an element for producing a jacket, folder or box according to the present disclosure are described hereinafter by way of an example, without any limiting nature, with reference to the accompanying figures, wherein.

DETAILED DESCRIPTION

Figure 1:
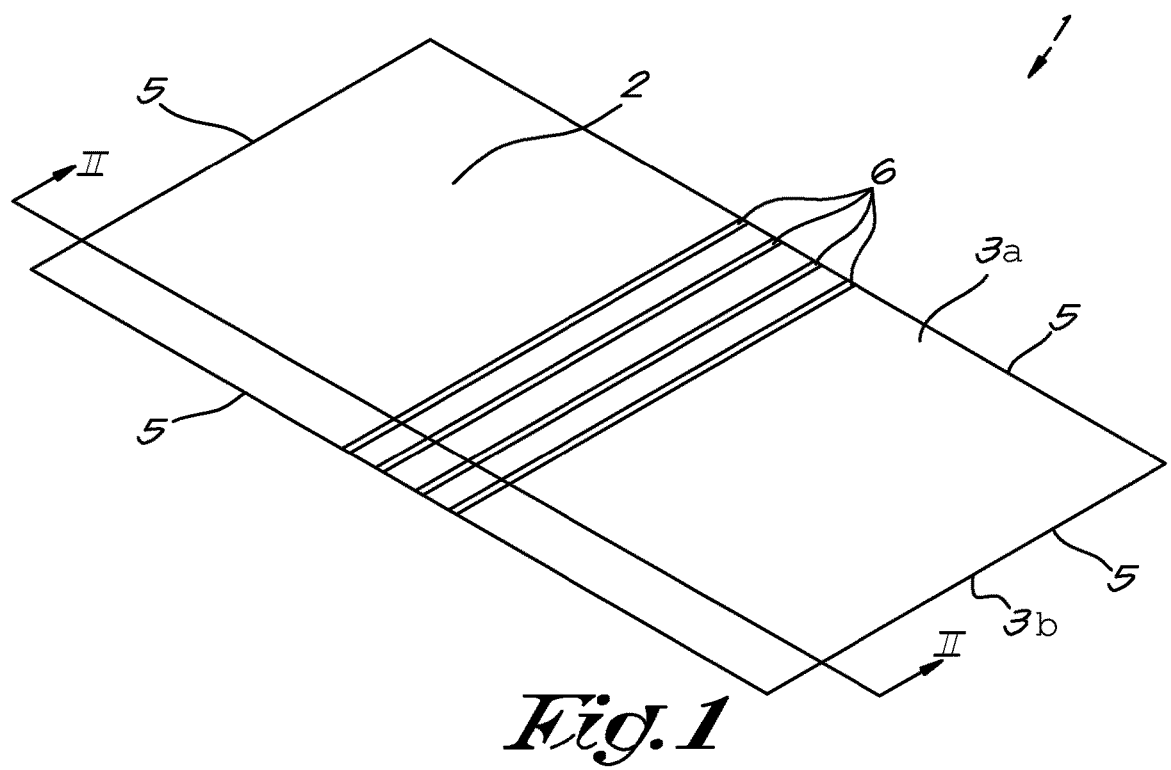
FIG. 1 schematically shows a perspective view of an element according to the present disclosure.
Figure 2:
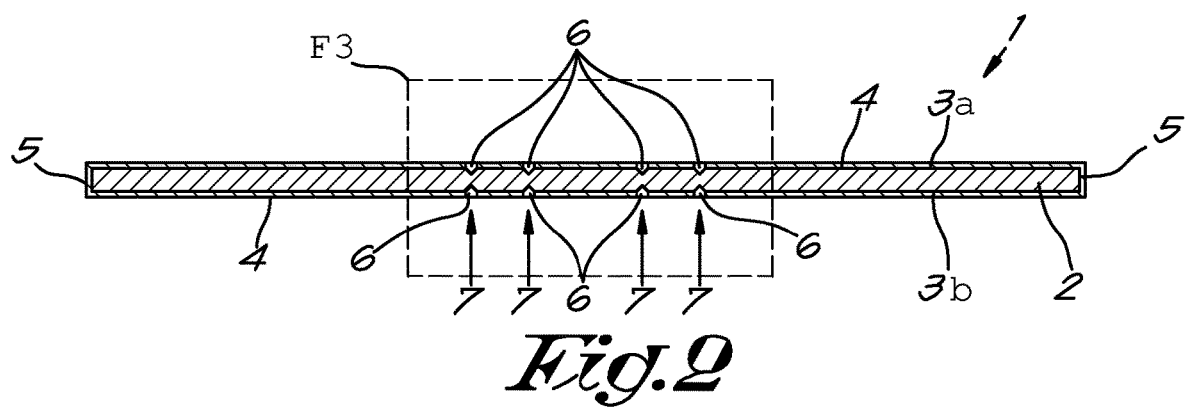
FIG. 2 shows the cross-section according to the line II-II of FIG. 1.

The element 1 according to the present disclosure shown in FIGS. 1 and 2 is a semi-finished product and comprises a sheet 2.

In this case, the sheet 2 is made of cardboard.

The sheet 2 may also be produced from rigid paper, thick paper, synthetic material or the like.

The sheet 2 is provided with a layer 4 of hotmelt adhesive on at least one side 3*a*, 3*b*, and in the case of FIGS. 1 and 2 on both sides 3*a*, 3*b*.

As shown in FIG. 2, the layer 4 of hotmelt adhesive is applied on the sheet 2.

The layer 4 of hotmelt adhesive is hereby applied directly on the sheet 2. This means that no layers of paper or other types of layers are applied between the layer 4 of hotmelt adhesive and the sheet 2.

In this case, the layer 4 of hotmelt adhesive is applied over practically the entire surface of the sheet 2.

In some embodiments, the layer 4 of hotmelt adhesive is also applied on side edges 5 of the sheet 2, but in some other embodiments, the layer 4 of hotmelt adhesive is not applied to the side edges 5 of the sheet.

In some embodiments, the layer 4 of hotmelt adhesive is a special hotmelt adhesive which will not soak in or be absorbed into the cardboard of the sheet 2, but will remain on top.

In this case, the sheet 2 is further provided with a number of grooves 6, in the example shown there are four grooves 6.

The grooves 6 are applied on both sides 3*a*, 3*b* of the sheet 2, in corresponding locations, as shown in FIG. 2.

By the grooves 6 the sheet 2 can be folded into, in this case, a jacket for a book or folder for a bundle of leaves.

The grooves 6 thus form hinges 7 as the sheet 2 is weakened locally on the level of the grooves 6.

Consequently, the sheet 2 can be folded on the level of the grooves 6.

In this case, the grooves 6 are V-shaped and can be produced by grooving or milling the sheet 2.

As shown in FIG. 2, the layer 4 of hotmelt adhesive is not applied in the grooves 6.

To realise this, the grooves 6 are first made in the sheet 2 by milling or grooving.

Subsequently, the layer 4 of hotmelt adhesive is applied on the sheet 2 by rollers.

On the level of the grooves 6, the sheet 2 will not make contact with the roller, such that no hotmelt adhesive ends up there.

Of course it is not excluded that the sheet 2 is first provided with a layer 4 of hotmelt adhesive over the whole surface and subsequently the grooves 6 are grooved or milled, whereby glue and cardboard are locally removed from the element 1.

The use of the element 1 is very simple and as follows.

Figure 3:
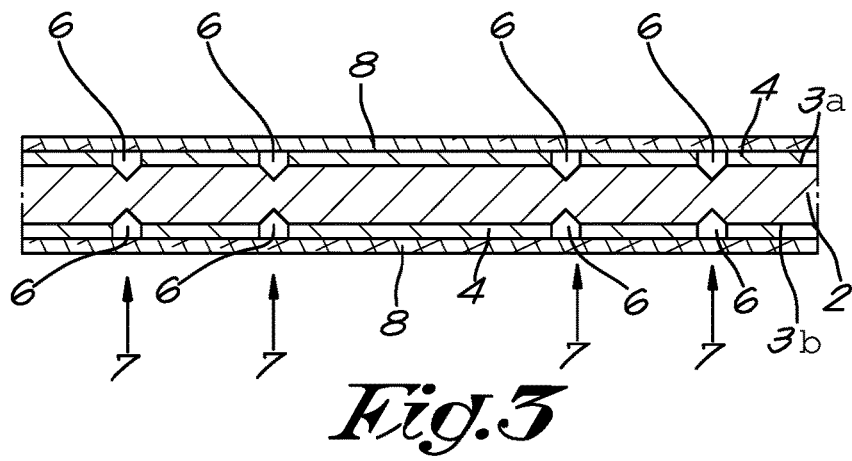
FIG. 3 shows the section indicated in FIG. 2 by F3 on a larger scale, but provided with a finishing layer.

FIG. 3 shows how the sheet 2 is provided or coated with a finishing layer 8, whereby the finishing layer 8 is applied directly on the layer 4 of hotmelt adhesive.

The finishing layer 8 is subsequently attached to the element 1 in the known way by heating the layer 4 of hotmelt adhesive.

As shown in FIG. 3, in this way there is only one layer of material, namely the finishing layer 8, which runs over the grooves 6 or coats the grooves 6.

Subsequently, the coated element 1 can be folded into a jacket or folder.

Figure 4:
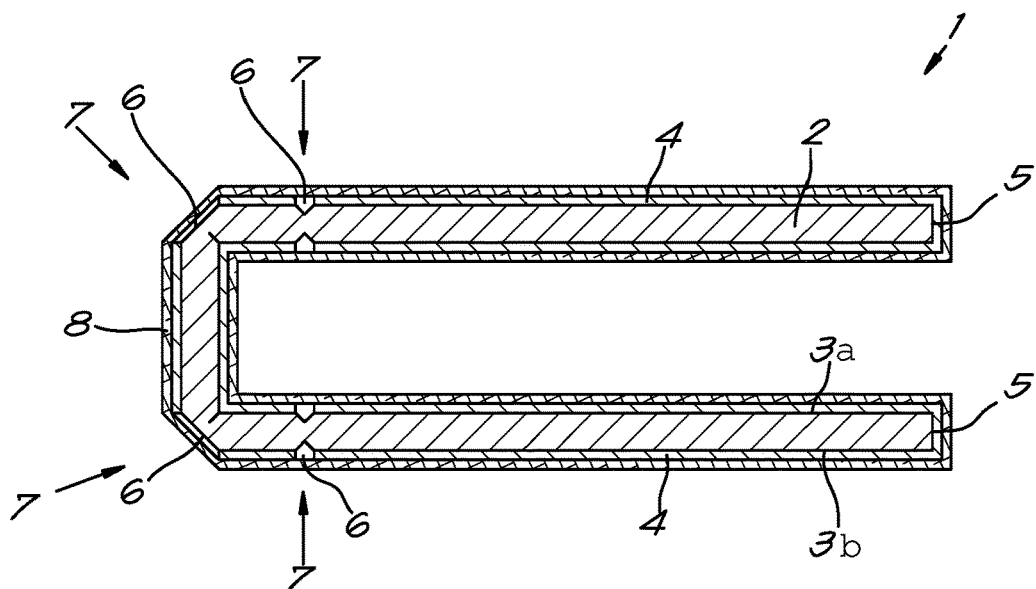
FIG. 4 shows a finished jacket, produced with the element as shown in FIGS. 1 and 2.

Although FIG. 4 shows that the finishing layer 8 is the same on both sides 3*a*, 3*b*, it is not excluded that two separate and different finishing layers 8 are applied, one for the side 3*b*, which becomes the outside, and one for the other side 3*a*, which becomes the inside, which are applied with an overlapping edge.

Although in the example of FIGS. 1 to 4 an element 1 is shown for forming a jacket, cover or folder, it is not excluded to provide an element 1 according to the present disclosure with which a box, packaging or presentation box can be produced.

The dimensions and the location of the one or more grooves 6 will hereby be chosen such that by folding the sheet 2, a box, or a section of a box, can be formed.

Indeed, for producing a box based on an element 1 according to the present disclosure, several elements 1 may be used, whereby each element 1 will form a section of the box.

Figure 5:
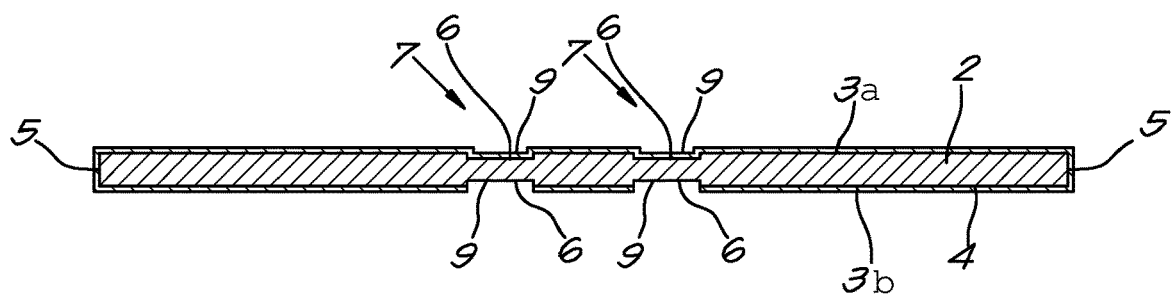
FIG. 5 shows an alternative cross section of an alternative embodiment of the present disclose.
Figure 6:
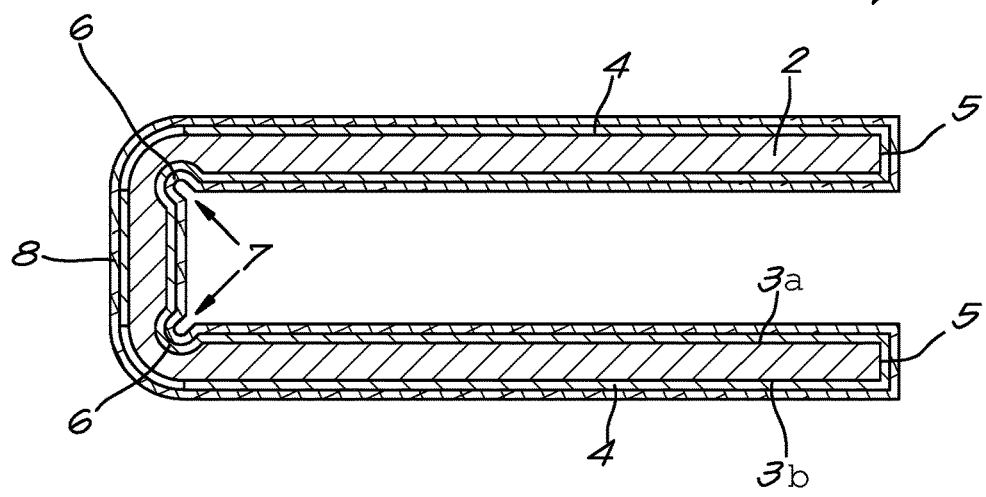
FIG. 6 shows a finished jacket, produced with the element of FIG. 5 according to the alternative embodiment of the present disclosure.

FIGS. 5 and 6 show a variant according to FIG. 1, whereby in this case the element 1 is suitable for making a jacket of a book.

A difference with the previous embodiment are the grooves 6, which in this case are U-shaped instead of V-shaped.

Even when there are only two grooves 6, the present disclosure is not restricted to this.

In this case, the layer 4 of hotmelt adhesive is also applied in the grooves 6 on one side 3*a* of the sheet 2, more particularly also in the bottom 9 of the grooves 6. The side 3*a* will become the inside of the jacket.

On the side 3*b*, which is the outside of the jacket, no hotmelt adhesive is applied in the grooves 6.

In this case the finishing layer 8, when applied around the element 1, will stick on the bottom 9 of the grooves 6 on the side 3*a* or the inside of the jacket.

The effect is that when the jacket is folded as shown in FIG. 6, the finishing layer 8 is pulled into the fold, such that a clean finish of the fold is obtained on the inside of the jacket.

Although in the examples shown and described above, a folder or jacket is referred to, it is not excluded that an element 1 according to the present disclosure is applied for producing a box, such as a packaging box, a gift box or presentation box.

The present disclosure is by not to the embodiments described as an example and shown in the drawings, but an element for producing a jacket, folder or box according to the present disclosure can be realised in all kinds of forms and dimensions, without departing from the scope of the present disclosure.

What is claimed is:

1. An element for producing a jacket, folder or box, the element relates to a semi-finished product comprising a sheet formed of a first material having a first surface and an opposite second surface, both of the first surface and the second surface are provided with a layer of hotmelt adhesive directly applied on the first surface and the second surface of the sheet for applying a finishing layer directly on the layer of hotmelt adhesive,
   wherein one of the first surface and the second surface includes one or more grooves for forming a hinge, and
   wherein the layer of hotmelt adhesive is provided on an entire portion of the first surface and the second surface expect that the layer of hotmelt adhesive is not applied in the one or more grooves.

2. The element according to claim 1, wherein the sheet is produced from rigid paper or cardboard.

3. The element according to claim 2, wherein the element is provided with a finishing layer which is applied directly on the layer of hotmelt adhesive.

4. The element according to claim 1, wherein the grooves are grooved or milled in the sheet.

5. The element according to claim 4, wherein the element is provided with a finishing layer which is applied directly on the layer of hotmelt adhesive.

6. The element according to claim 1, wherein the layer of hotmelt adhesive is not absorbed into the sheet or does not soak into the sheet.

7. The element according to claim 6, wherein the element is provided with a finishing layer which is applied directly on the layer of hotmelt adhesive.

8. The element according to claim 1, wherein the element is provided with a finishing layer which is applied directly on the layer of hotmelt adhesive.

9. The element according to claim 1, wherein both of the first surface and the second surface includes the one or more grooves for forming the hinge.

10. The element according to claim 9, wherein the element is provided with a finishing layer which is applied directly on the layer of hotmelt adhesive.

\* \* \* \* \*